(12) United States Patent

Narayan et al.

(10) Patent No.: US 8,543,088 B2
(45) Date of Patent: Sep. 24, 2013

(54) SYSTEM AND METHOD OF USING DIAMETER BASED SIGNALING TO SUPPORT BILLING MODELS FOR VISUALLY RENDERED SERVICES

(75) Inventors: Pramodh D. Narayan, Naperville, IL (US); Mark D. Nielsen, Austin, TX (US); Lasith G. Perera, Lake Oswego, OR (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 12/190,270

(22) Filed: Aug. 12, 2008

(65) Prior Publication Data

US 2010/0041369 A1 Feb. 18, 2010

(51) Int. Cl.
*H04M 11/00* (2006.01)
*H04M 15/00* (2006.01)
*G06F 15/173* (2006.01)

(52) U.S. Cl.
USPC ........ 455/408; 455/405; 705/34; 379/114.01; 709/229

(58) Field of Classification Search
USPC ...... 370/338; 455/433, 435, 456.1, 405–411; 379/114–115; 709/227, 229; 705/34
See application file for complete search history.

(56) References Cited

U.S. PATENT DOCUMENTS

| | | |
|---|---|---|
| 6,243,572 B1 | 6/2001 | Chow et al. |
| 6,404,738 B1 | 6/2002 | Reininger et al. |
| 7,079,499 B1 | 7/2006 | Akhtar et al. |
| 7,194,554 B1 | 3/2007 | Short et al. |
| 7,257,636 B2 | 8/2007 | Lee et al. |
| 7,266,371 B1 | 9/2007 | Amin et al. |
| 7,310,663 B2 | 12/2007 | Bellinger et al. |
| 7,583,646 B2 * | 9/2009 | Hua et al. ...................... 370/338 |
| 2003/0233329 A1 * | 12/2003 | Laraki et al. .................... 705/52 |
| 2004/0090969 A1 | 5/2004 | Jerrard-Dunne et al. |
| 2006/0178132 A1 | 8/2006 | Tammi et al. |
| 2006/0253873 A1 | 11/2006 | Lim et al. |
| 2007/0047530 A1 | 3/2007 | Ayers et al. |

(Continued)

FOREIGN PATENT DOCUMENTS

EP 1 662 701 11/2005

OTHER PUBLICATIONS

Jyh-Cheng Chen, et al; "Fast Handoff in Mobile Virtual Private Networks"; copyright 2006 IEEE; Proceedings of the 2006 International Symposium on a World of Wireless, Mobile and Multimedia Newtworks.

(Continued)

*Primary Examiner* — Nizar Sivji
(74) *Attorney, Agent, or Firm* — Matthew Chung; Roberts Mlotkowski Safran & Cole, P.C.

(57) ABSTRACT

A system and method of using Diameter based signaling is provided to track usage to support multiple billing models for visually rendered revenue generating services in an IP Multimedia subsystem based network. The system includes a computer system includes first program instructions to provide usage information to an accounting platform for processing charging information for visually rendered services in an IP Multimedia subsystem based network. The computer system also comprises a computer readable media which stores the first program instructions and a central processing unit to execute the first program instructions.

10 Claims, 4 Drawing Sheets

(56) References Cited

U.S. PATENT DOCUMENTS

| | | |
|---|---|---|
| 2007/0127682 A1 | 6/2007 | Fleming et al. |
| 2007/0133510 A1 | 6/2007 | Da Palma et al. |
| 2007/0270123 A1 | 11/2007 | Cai et al. |
| 2008/0010179 A1 | 1/2008 | Cai et al. |
| 2008/0082455 A1 | 4/2008 | Cai et al. |
| 2008/0256250 A1 | 10/2008 | Wakefield |
| 2008/0268847 A1 | 10/2008 | Mukherjee et al. |
| 2009/0022285 A1* | 1/2009 | Swanburg et al. ......... 379/88.11 |
| 2011/0085646 A1* | 4/2011 | Sigmund et al. ........... 379/88.22 |

OTHER PUBLICATIONS

Srisakul Thakolsri, et al.; "Accounting Management for Session Mobility in an Ubiquitous Environment"; IWCMC'06, Jul. 3-6, 2006, Vancouver, British Columbia, Canada.; pp. 311-316.

Frank Eyermann, et al.; "Generic Accounting Configuration Management for Heterogeneous Mobil Networks"; WMASH'05, Sep. 2, 2005, Cologne, Germany; pp. 46-55.

Susana Sargento, et al.; "Integration of Mobility and QoS in 4G Scenarios"; Q2SWinet'07, Oct. 22, 2007, Chania, Crete Island, Greece; pp. 47-54.

Sok-Ian Sou; "Performance Analysis of Credit Re-authorization Schemes in UMTS Online Charging System"; IWCMC'07, Aug. 12-16, 2007, Honolulu, Hawaii, USA; pp. 55-60.

Office Action dated Mar. 15, 2012 for U.S. Appl. No. 12/178,831.

Final Office Action dated Oct. 16, 2012 in U.S. Appl. No. 12/178,831, 26 pages.

Notice of Allowance dated May 15, 2013 in U.S. Appl. No. 12/178,831, 11 pages.

* cited by examiner

SYSTEM AND METHOD OF USING DIAMETER BASED SIGNALING TO SUPPORT BILLING MODELS FOR VISUALLY RENDERED SERVICES

FIELD OF THE INVENTION

The invention relates to a system and method of using Diameter based signaling to track usage to support multiple billing models for visually rendered revenue generating services in an IP Multimedia subsystem based network.

BACKGROUND

Traditional consumer centric (as opposed to enterprise centric) telecommunications services have typically involved broad categories of services. For example, these services include voice services that are primarily delivered using handsets, both wired handsets and wireless handsets, as well as data services, which provide access to features such as SMS (Short Messaging Services) and access to the Internet. Increasingly, data services are also delivering digital media content such as music and video to handsets.

In both voice and data services, in most telecommunications networks, there is a proliferation of Service Delivery Platforms that has resulted in silo'ed network architecture with the following broad characteristics:
  Subscriber data is scattered in a variety of different repositories in the telecommunications network;
  Provisioning activities have to incorporate the "logic" necessary to provision subscriber information in all the multiple repositories;
  Service Applications that provide the services have to look at these multiple repositories during their call flow invocation sequence; and
  The controls/policy associated with the services is managed by the services themselves, in adherence with the silo based architecture.

To address some of the above issues, the IMS (IP Multimedia Subsystem) architecture uses a central repository called the Home Subscriber Server (HSS). This central repository uses the Diameter protocol to provide access to this data, and to allow IMS defined nodes to subscribe to changes in subscriber information. However, the HSS based subscriber profile does not support any aspects of the subscriber profile that pertain to visual characteristics, such as the characteristics of a WAP page (Wireless Access Protocol) or a traditional portal rendered browser, such as a JSR 168 compliant portlet.

While it is true that no large scale implementations of IMS networks currently exist, what is also true is that these network implementations have not in any significant way addressed the domain of visually rendered revenue generating network services. Also, in both cases, there is a significant gap with respect to integrating accounting models for the purposes of supporting flexible downstream rating and subsequent billing models, specifically into an existing IP Multimedia Subsystem based infrastructure both for those that are prepaid as well as those that are postpaid.

SUMMARY

In an aspect of the invention, a computer system comprises first program instructions to provide usage information to an accounting platform for processing charging information for visually rendered services in an IP Multimedia subsystem based network. The computer system also comprises a computer readable media which stores the first program instructions and a central processing unit to execute the first program instructions.

In embodiments, the first program instructions provides for integration of charging capabilities for internet based services into a carrier charging platform based on the IP Multimedia Subsystem based network. The first program instructions uses diameter based signaling to dynamically control the charging information. The first program instructions consolidates user profile data from a common Home Subscriber Service (HSS). The first program instructions monitors or tracks usage of the visually rendered services and terminates the visually rendered services when a user prepaid subscription has expired. The first program instructions renders the visually rendered services to a user based on stored user profile information. The stored user profile information is at least subscription information. The monitoring or tracking includes at least one of type of service rendered, size of content and activities of a user. The first program instructions sends a Diameter based message, which includes a user's usage and subscription information, to an accounting platform information, the accounting platform is configured to process the usage and subscription information and send it to a charging platform. The accounting platform validates a credit and sends a message to the first program instructions to terminate usage of the visually rendered services. The accounting platform supports multiple billing models for the visually rendered services using a Sh sub-protocol and is operable to handle authorization via Diameter based signaling protocol. The first program instructions is at least one of maintained, deployed, created and supported on a computing infrastructure by a service provider.

In another aspect of the invention, a method to charge for rendering visual services, comprises providing a computer infrastructure being operable to: receive a request for visually rendered services; request profile information using Sh message set with Diameter protocol from an HSS; render the visually rendered services to a user; track or monitor usage information of the visually rendered services to determine a fee for the rendering; and provide the usage information to an accounting platform using the Diameter protocol to calculate the fee for the rendering.

In embodiments, the computer infrastructure is at least one of maintained, deployed, created and supported on a computing infrastructure by a service provider. The computer infrastructure is operable to: determine a prepaid subscription of the user; and terminate the visually rendered services when the user has met or exceeded the prepaid subscription. The method further comprises providing the fee to a charging platform using the Diameter protocol.

In yet another aspect of the invention, a system comprises a services plane comprising a rendering agent configured to render visually rendered services in an IP Multimedia subsystem based network to a user in a user plane. The rendering agent is further configured to track or monitor usage of the visually rendered services and provide the usage information to an accounting platform in a control plane using Sh message set with Diameter protocol.

In still another aspect of the invention, a computer program product is provided for generating charging information for visual services. The computer program product comprising: a computer readable medium; first program instructions to receive a request for visually rendered services, request profile information from an HSS using Sh message set with the Diameter based signaling protocol and track usage of the visually rendered services; and second program instructions which receives the tracked usage from the first program instructions via the Diameter based signaling protocol, calculates a fee based on the tracked usage, and sends the calculated fee to a charging platform. The first and second program instructions are stored on the computer readable media and executed on a computer infrastructure.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to a system and method of using Diameter based signaling to track content or service usage of an end user to support multiple billing models for visually rendered revenue generating services in an IP Multimedia subsystem based network. More specifically, the present specifically relates to the realization of charging and billing models for visually rendered revenue generating services, which are a new, mostly unexplored category of services expected to be a significant new source of revenue for wireless and wire-line carriers.

The system and method of the present invention takes advantage of IMS using HSS (Home subscriber Server), e.g., a centralized repository, for authentication, authorization, accounting and the maintenance of subscriber information. The present invention utilizes subscriber information stored in the HSS to process and send billing information for the visually rendered services to a charging platform using the Diameter protocol. That is, the present invention provides a unique mechanism with which a portal or web based platform can integrate into an IMS infrastructure for purposes of supporting flexible charging models dynamically. The Diameter protocol is a significant addition to the existing legacy RADIUS (Remote Access Dial In User Service) Protocol to provide for billing methodologies in accordance with the present invention.

For example, in embodiments, the present invention supports HSS based subscriber profiles that pertain to visual characteristics, such as the characteristics of a WAP page (Wireless Access Protocol) or a traditional portal rendered browser, such as a JSR 168 compliant portlet. This is particularly advantageous since many telecommunications services (especially in the wireless carrier domain) are going to be visually rendered. Also, the present invention takes advantage of emerging evolution of network technologies such as 802.16e (e.g., Wimax).

Examples of visually rendered subscription based services and carrier grade subscriber services that can be implemented with the present invention include, for example:

A browser based visually rendered media player that allows for location sensitive content to be delivered to subscribers such as, for example, a location based service that allows for subscribers on a chat list to be located visually in near real time;

A presence service that visually displays the status of buddies when they are active on the telecommunications network (e.g., when a data service card is activated and connects to the mobile IP network, or when a mobile phone starts a voice session);

A search service that visually, asynchronously, returns results based on changing location;

JSR 168 compliant portlet that leverages an underlying carrier network housed location platform to map a buddy list; and/or Any other visually rendered subscription services such as, for example, instant messaging, weather services, or other content provided by a service provider or content provider.

As such, the present invention will support, for example, rich context sensitive visually rendered, revenue generating services to be surfaced and tracked;

rich context sensitive visually rendered, revenue generating services to be delivered to subscribers as part of a revenue generating business model that is not predicated solely on bandwidth based access (as is the current view) or an MRC (Monthly recurring Charge);

accounting model support via the Diameter protocol to support integration into an existing IMS (IP Multimedia Subsystem) core; and usage scenarios that account for both pre-paid as well as postpaid models, for visually rendered services.

Thus, the system and method of the present invention is configured to deliver blended next generation services more efficiently, while providing multiple billing methods for the implementation of the IMS (IP Multimedia subsystem) using HSS and Diameter based protocols. Those of skill in the art should understood that IMS uses the SIP Protocol (Session Initiated Protocol) for all signaling, and by separating the signaling channels from media, is able to efficiently maintain sessions in a media independent manner. This allows for richer multi media services to be blended and delivered to end subscribers with the notion of built in QoS (Quality of Service).

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM), an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
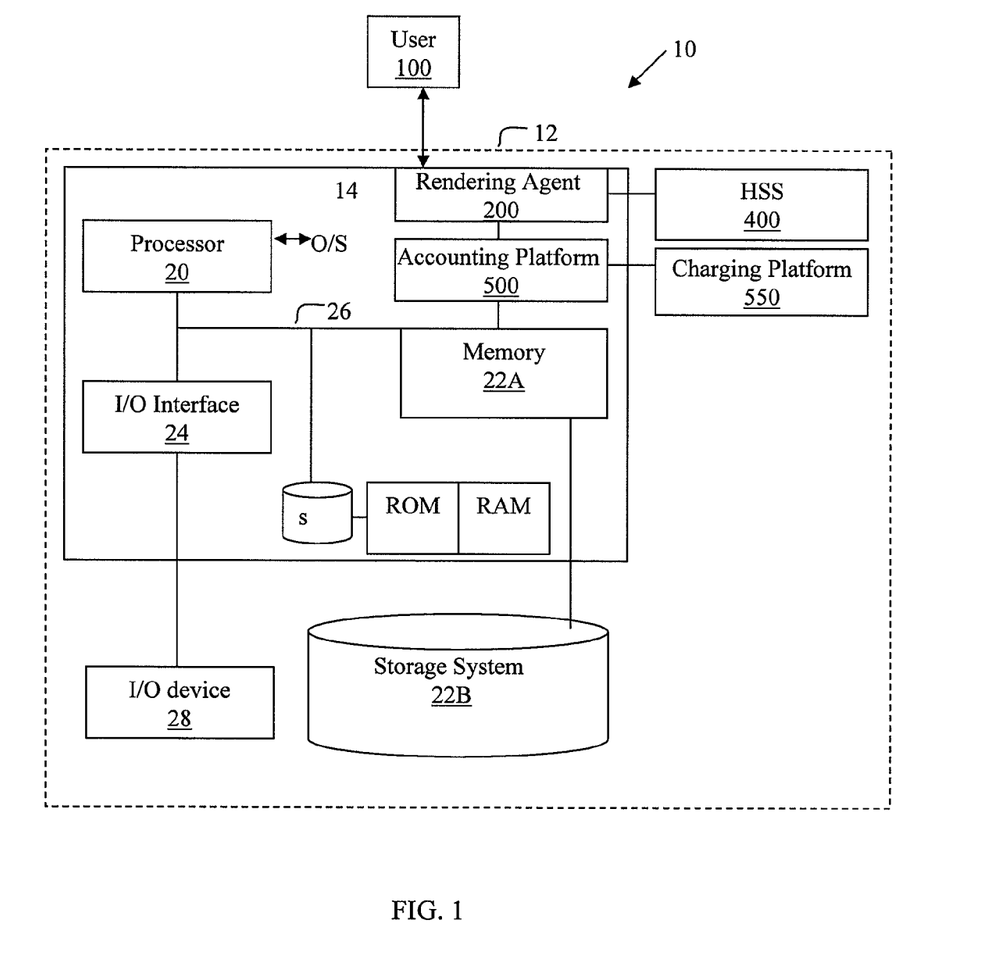
FIG. 1 shows an illustrative environment for implementing the steps in accordance with the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a rendering agent (module or program code) 200 configured to make the computing device 14 operable to perform the services described herein. The rendering agent 200 can be implemented as one or more program code stored in memory 22A as separate or combined modules. In an illustrative example, the rendering agent 200 can be a web service which receives a request from a user 100 for a particular visually rendered service such as discussed above. In embodiments, the rendering agent 200 performs a conventional IFC (Initial Filter Criteria) as is required for an IMS service and provides permission for the user 100 to receive the visually rendered service. The rendering agent 200 can activate the visually rendered service such as a JSR 168 portlet, specifically to integrate with an IMS core based on an HSS repository 400.

In embodiments, the rendering agent 200 communicates with the HSS repository 400 to obtain user preference information. The preference information may contain visually rendered revenue-generating services such as pertaining to the layout of a WAP browser rendered page or a page based on portlets, as well as particular subscription information and charging models for particular users and particular services.

In implementation, the rendering agent 200, leverages the Diameter protocol enabled "Sh" message set to communicate preferences pertaining to subscribed services that are visually rendered. The rendering agent 200 also allows for this information to be dynamically processed by rendering preferences at runtime. This can be accomplished for blended or composite visually rendered revenue-generating services that have a significant rendering requirement.

The rendering agent 200 will keep track of usage and send Diameter based Rf compliant records to an accounting platform (also referred to as an accounting server) 500. The accounting platform 500 communicates to an IMS charging platform 550 for downstream mediation and billing. The records will include, for example, usage information such as the type of service rendered, the size of delivered content (or message), the activities of the user, e.g., typing, viewing, downloading, uploading, sending, etc., as well as the charging model. The charging model can be obtained from the HSS repository 400, for example. In embodiments, an agent can be resident on the user device to provide such information to the accounting platform 500.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device, PDA, handset, etc. In particular, the I/O device 28 may be used to display a visual representation (service) in accordance with the invention such as, for example, icon based click on lists or other visual services.

In general, the processor 20 executes computer program code, which can be stored in the memory 22A and/or storage system 22B. While executing the computer program code, the processor 20 can read and/or write data to/from memory 22A, storage system 22B, and/or I/O interface 24. The program code executes the processes of the invention. The storage system 22B may be an HSS repository. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, a mobile user or a third party requesting content, or information about another user. In return, the service provider can receive payment from the customer(s) under a subscription and/or fee agreement and/or the service provider can receive payment from the sale of advertising content to one or more third parties.

Exemplary Processes and System Architecture

Figure 2:
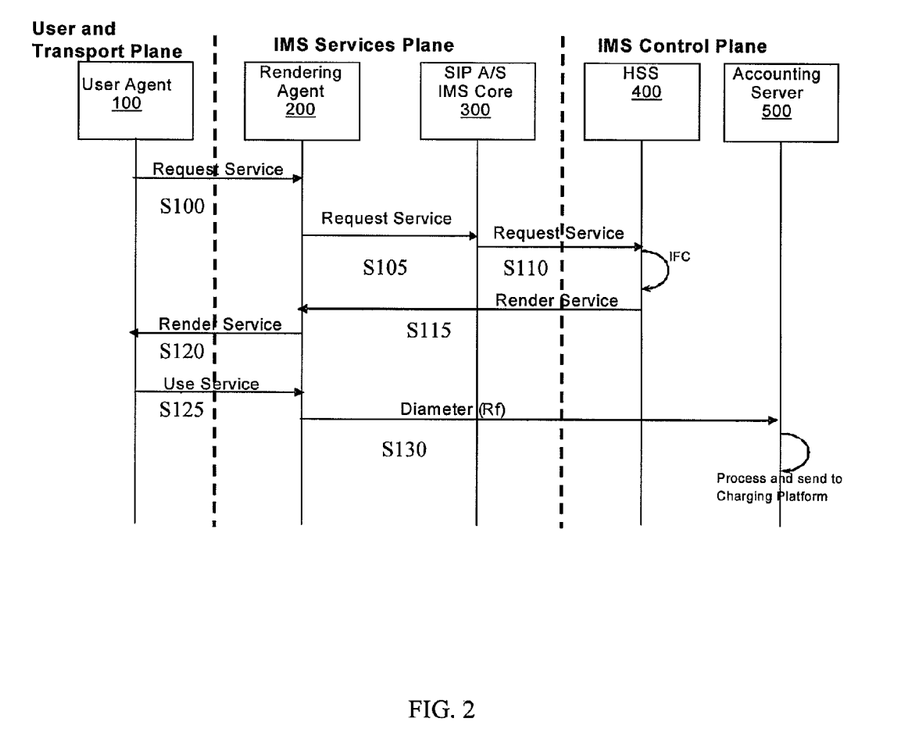
FIG. 2 is a swim lane diagram implementing an exemplary process in accordance with aspects of the invention.
Figure 3:
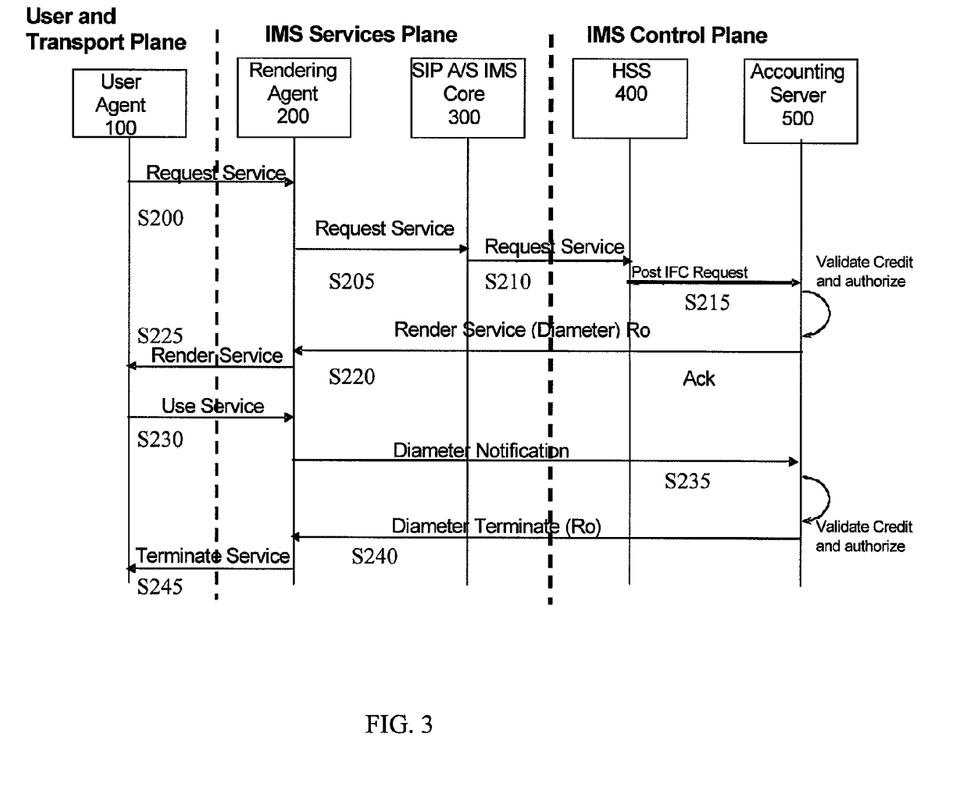
FIG. 3 is a swim lane diagram implementing another exemplary process in accordance with aspects of the invention.

FIGS. 2 and 3 illustrate exemplary processes in accordance with the present invention. The processes of the present invention are service and platform agnostic. The steps of FIGS. 2 and 3 may be implemented on the computer infrastructure of FIG. 1, for example. The swim lane diagrams in FIGS. 2 and 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

More specifically, FIG. 2 shows a swim lane diagram implementing exemplary processes in accordance with aspects of the invention. The swim lane diagram shows five "players": the user agent 100, the rendering agent 200, a SIP/IMS Core 300, the HSS 400 and the accounting server 500. The user agent 100 is in a user and transport plane, the rendering agent 200 and SIP/IMS Core 300 are in an IMS services plane and the HSS 400 and accounting server 500 are in an IMS control plane. The processes of FIG. 2 are agnostic to any services.

The user agent 100 may be any end user device such as, for example, a PDA, a cellular telephone or other portable-computing device. In embodiments, the user is depicted as the I/O device 28 of FIG. 1.

The rendering agent 200 renders the services of the invention and may be, for example, a service provider. In embodiments, the rendering agent 200 is the web infrastructure that is associated with the service that visually renders the service by communicating with the telecommunications' infrastructure. As described herein, the rendering agent 200 may be notified of any profile data by the HSS 400.

The SIP (session initiated protocol) IMS core 300 is a SIP application that eases the integration of IMS with the Internet. SIP is a signaling protocol used for setting up and tearing down multimedia communication sessions over the Internet. Applications can include, for example, streaming multimedia content, video conferencing, instant messaging and other types of visually rendered content. SIP is also transport independent and can be used with UDP, TCP, SCTP, etc. SIP can be used in any application where session initiation is a requirement such as, for example, event subscription.

The HSS 400 is a master user database that supports the IMS network entities that handle calls or services. The HSS 400 contains the user subscription-related information (user profiles) and billing information, and performs authentication and authorization of the user. In embodiments, the HSS 400 is similar to the GSM home Location Register (HLR) and Authentication Centre (AUC).

The accounting server (platform) 500 is configured to receive usage information from either the rendering agent 400 or an agent residing on the user's device. The accounting server 500 will process accounting information, e.g., billing information, and send such information to a charging platform. The accounting information will also be sent to the rendering agent 200. In embodiments, the accounting server 500 can provide validation and authorization information to the rendering agent 200. That is, in embodiments, the accounting server 500 can be configured to receive information from the HSS 400 about account information, e.g., payment and subscription history of the user, and send such information to the rendering agent for terminating a session, if necessary.

At step S100, the user requests a visually rendered service from the rendering agent. At step S105, the rendering agent sends a request for services to the SIP IMS core using an HTTP protocol, for example. At step S110, the request for service is forwarded to the HSS, via Sh message set with the Diameter protocol. The HSS will query its repository and provide service information for the requesting user to the rendering agent at step S115. This information may also include, for example, subscription and/or billing information.

At step S120, the rendering agent will render the services to the user, using the information obtained from the HSS. The user will use, e.g., display, the visually rendered service at step S125, which will be tracked and/or monitored by the rendering agent. The rendering agent can track or monitor, for example, the type of services rendered, a time period the user is using the service, the type of content, the amount of content that is uploaded and downloaded, the type and length of communications with other users (e.g., instant messaging, etc.), text or visual, or any other information which can be used for billing purposes, e.g., to determine a fee for the rendering.

At step S130, the rendering agent provides such tracked and/or monitored information to the accounting server. In turn, the accounting server processes the billing information, e.g., fee, knowing the user's subscription information and tracked and/or monitored information. The billing information is forwarded to a charging platform using, for example, the Diameter protocol. In embodiments, the agent residing on the user's device can also provide the tracked and/or monitored information directly to the accounting server.

FIG. 3 shows a swim lane diagram implementing additional or alternative exemplary processes in accordance with aspects of the invention. The swim lane diagram shows five "players": the user agent 100, the rendering agent 200, SIP/IMS Core 300, HSS 400 and accounting server 500. Much like that shown in FIG. 2, the user agent 100 is in a user and transport plane, the rendering agent 200 and SIP/IMS Core 300 are in the IMS services plane and the HSS 400 and accounting server 500 are in the IMS control plane. The processes of FIG. 3 are agnostic to any services.

In embodiments, FIG. 3 shows a flow diagram for Diameter based accounting for visually rendered revenue generating services, assuming a generic prepaid scenario. In this scenario, at step S200, the user requests a visually rendered service from the rendering agent. At step S205, the rendering agent sends a request for services to the SIP IMS core using an HTTP protocol, for example. At step S210, the request for service is forwarded to the HSS, via the Sh message set with the Diameter protocol. The HSS will query its repository and provide subscription information to the accounting server at step S215. The subscription information may include, for example, prepaid subscription information, including time and/or money left on the prepaid subscription.

At step S220, the accounting server will validate the user's credit and authorize the rendering of the content to the user by providing such notification to the rendering agent. In embodiments, the notification may be provided by use of the Diameter protocol. In embodiments, at step S225, the rendering agent will render the visually rendered services to the user using information obtained from the accounting server and, in embodiments, the HSS.

At step S230, the user will use, e.g., display, the visually rendered service, which will be tracked and/or monitored by the rendering agent. In an optional embodiment, the rendering agent can track a time of usage by the user and, if necessary, terminate the services upon expiration of the subscribed time period, etc. Also, the rendering agent can track, for example, the type of services rendered, the type of content, the amount of content consumed including uploading and downloading activities, the type of communications with other users, text or visual, or any other information which can be used for billing purposes.

At step S235, the usage information is provided to the accounting server via a Diameter protocol. This can start the clock for tracking the usage time period for comparison against the time remaining on the prepaid subscription. (In the alternate embodiment, the time can start when the rendering agent begins to track and/or monitor usage.) The accounting server will validate the credit and continue to authorize use so long as the usage period has not exceeded the time remaining on the prepaid subscription.

At step S240, the accounting server will send a Diameter based terminate notification to the rendering agent. This is typically performed when the usage period has been met or exceeded the prepaid subscription time. At step S245, the rendering agent will terminate the services. In embodiments, the agent residing on the user's device can also provide the tracked and/or monitored information directly to the accounting server.

Figure 4:
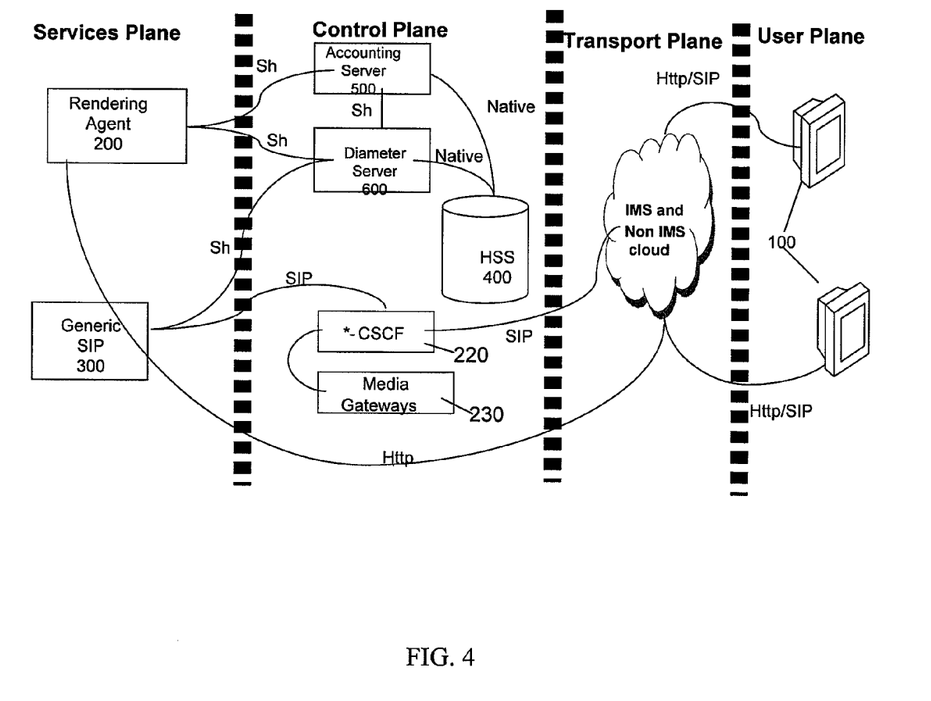
FIG. 4 shows an overview of the architecture in accordance with aspects of the invention.

FIG. 4 shows an overview of the architecture in accordance with aspects of the invention. In particular, the architecture is shown in four planes: services plane; control plane; transport plane; and user plane. The services plane includes the rendering agent 200 and a generic SIP A/S 300. As should be understood by one of ordinary skill in the art, a generic SIP A/S is an application-layer control protocol or signaling protocol for Internet Telephony. SIP can establish sessions for features such as audio/videoconferencing, interactive gaming, and call forwarding to be deployed over IP networks, thus enabling service providers to integrate basic IP telephony services with Web, e-mail, and chat services. In addition to user authentication, redirect and registration services, SIP supports traditional telephony features such as personal mobility, time-of-day routing and call forwarding based on the geographical location of the person being called.

The control plane includes the accounting server 500 and Diameter Server 600 both communicating with the HSS database 400 via a native protocol. The Diameter Server 600 is also used as a conduit for communication between the HSS 400 and the rendering agent 200 and the generic SIP A/S 300. These communications use a Sh protocol. The rendering agent 200 also communicates with the HSS 400 through the accounting server (platform) 400 via the Sh protocol.

The control plane also includes a CSCF (Call Session Control Function) 220 and media gateway 230. The CSCF 220 provides session control for subscribers accessing services within the IMS network. In essence the CSCF is a SIP Server which has responsibility for interacting with network databases such as the HSS for mobility. The media gateway 230 includes components that ensure that media is delivered properly to all of the end points. The generic SIP A/S communicates with the CSCF 220 via a SIP, as does the media gateway 230.

The transport plane includes an IMS network and non IMS network. The rendering agent communicates with the IMS and/or non IMS network via Http. The CSCF 220 communicates with the IMS network and/or non IMS network via a SIP message.

The user plane includes the user or end point devices 100. The end point devices 100 communicate with the IMS network and non IMS network via Http/SIP. In implementation, using the Diameter Server 600 and rendering agent 200 it is now possible to provide visually rendered services to the end point devices 100 in accordance with the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system comprising:
   first program instructions to:
   render visually rendered services to a user in an IP Multimedia subsystem based network based on stored user profile information including subscription information;
   monitor or track usage of the visually rendered services using the stored profile information; and
   provide usage information and subscription information of the user to an accounting platform for processing charging information for the visually rendered services;
   a computer readable media which stores the first program instructions; and
   a processor to execute the first program instructions,
   wherein:
   the first program instructions sends a Diameter based message, which includes the user's usage and subscription information, to an accounting platform;
   the accounting platform is configured to process the usage and subscription information and send it to a charging platform; and
   the accounting platform supports multiple billing models for the visually rendered services using a Sh subprotocol and is operable to handle authorization via Diameter based signaling protocol.

2. The computer system of claim 1, wherein the first program instructions provides for integration of charging capabilities for internet based services into a carrier charging platform based on the IP Multimedia Subsystem based network.

3. The computer system of claim 1, wherein the first program instructions uses diameter based signaling to dynamically control the charging information.

4. The computer system of claim 1, wherein the first program instructions consolidates user profile information from a common Home Subscriber Service (HSS).

5. The computer system of claim 1, wherein the first program instructions terminates the visually rendered services when a user prepaid subscription has expired.

6. The computer system of claim 1, wherein the monitoring or tracking includes at least one of type of service rendered, size of content and activities of the user.

7. The computer system of claim 1, wherein the accounting platform validates a credit and sends a message to the first program instructions to terminate usage of the visually rendered services.

8. The computer system of claim 1, wherein at least the first program instructions is at least one of maintained, deployed, created and supported on a computing infrastructure by a service provider.

9. A computer system comprising:
   first program instructions to:
   render visually rendered services to a user in an IP Multimedia subsystem based network based on stored user profile information including subscription information;
   monitor or track usage of the visually rendered services using the stored profile information; and
   provide usage information and subscription information of the user to an accounting platform for processing charging information for the visually rendered services;
   a computer readable media which stores the first program instructions; and
   a processor to execute the first program instructions,
   wherein:
   the first program instructions receive a user request for the visually rendered services;
   the first program instructions send a request for services to a subscriber server via an internet protocol multimedia subsystem (IMS);
   the first program instructions receive the subscription information and a charging model from a user profile stored in a subscriber server, the subscription information and the charging model being for a first user and a first service;
   the first program instructions visually render the first service based on preferences included in the subscription information, wherein the preferences are dynamically processed at runtime;
   the first program instructions provide the charging model to the accounting platform; and
   the usage information includes at least one of a type of service rendered, a size of delivered content of the rendered service, and activities of the user.

10. The computer system of claim 9, wherein:
    the first program instructions reside on a user device;
    the IMS is an SIP Protocol (Session Initiated Protocol) IMS core;
    the request for services is sent to the subscriber server using both HTTP protocol and the Diameter protocol; and
    the subscriber server is an HSS.

* * * * *